United States Patent [19]

Fulenwider et al.

[11] 4,074,840

[45] Feb. 21, 1978

[54] HAND-HELD TOOL FOR OPTICAL FIBER WAVEGUIDE END PREPARATION

[75] Inventors: John E. Fulenwider, Concord; Carl Belmonte, Somerville; Mark L. Dakss, Sudbury, all of Mass.

[73] Assignee: GTE Laboratories Incorporated, Waltham, Mass.

[21] Appl. No.: 778,885

[22] Filed: Mar. 18, 1977

[51] Int. Cl.² .............................................. B26F 3/00
[52] U.S. Cl. .................................... 225/96.5; 225/101; 225/105
[58] Field of Search .............. 225/105, 104, 103, 101, 225/96.5, 2

[56] References Cited

U.S. PATENT DOCUMENTS

| | | | |
|---|---|---|---|
| 3,934,773 | 1/1976 | Chinnock et al. | 225/96.5 X |
| 4,017,013 | 4/1977 | Hawk et al. | 225/101 X |

*Primary Examiner*—J. M. Meister
*Attorney, Agent, or Firm*—David M. Keay; Robert A. Seldon

[57] ABSTRACT

A tool for preparing the ends of optical fiber waveguides prior to such operations as splicing is disclosed. The tool is adapted for single-handed operation and comprises a pair of manually actuated handles, first and second fiber-supporting surfaces, and a third fiber-supporting surface interjacent the first and second. The optical fiber waveguide is secured to the first and second surfaces by a pair of clamps which are responsive to the squeezing of the handles.

Once the fiber waveguide is secured to the surfaces, further squeezing of the handle produces separating rotation of a pair of jaw members to stress the fiber. A cutting blade, suspended above the third surface, is released by the manual actuation of a thumb latch positioned on the tool in alignment with the natural position of the operator's thumb when the handles are being squeezed. Rotation of the thumb latch permits the blade to fall, either under the influence of gravity or a driving spring, to produce a peripheral microcrack on a portion of optical fiber waveguide lying on the third fiber-supporting surface. The induced stress, and curved support, of the fiber waveguide act in combination to propagate the microcrack diametrically through the fiber so that an appropriate fiber end is obtained.

4 Claims, 6 Drawing Figures

HAND-HELD TOOL FOR OPTICAL FIBER WAVEGUIDE END PREPARATION

FIELD OF THE INVENTION

This invention relates to tools and, more particularly, to a hand-held tool for preparing the ends of optical fiber waveguides.

A major impediment to the development of optical communication is the implementation of low-loss splicing and coupling techniques. The techniques require properly prepared fiber ends, meaning that the ends must be smooth, flat and perpendicular to the fiber axis if high coupling efficiencies are to be obtained. An effective technique for fiber end preparation has been the score-and-break (SAB) technique, originally designed for use in the laboratory. The technique involves the stretching of the fiber over a curved surface and a light scoring by a hard, sharp edge such as a diamond to produce a microcrack which is diametrically propagated through the fiber to produce a clean break. The curved surface ensures a proper break for fibers having a diameter greater than a critical diameter, which for fused quartz is 110μm, by providing a stress gradient in the streched fiber; it is not necessary to provide a curved surface, however, if the fiber waveguide has a diameter which is less than this critical value.

It may be readily appreciated that fiber end preparation is likely to occur under field conditions and it is therefore desirable to provide a tool which is highly portable and simple to operate. Preferably, the tool should be similar to one familar to service personnel.

DESCRIPTION OF THE PRIOR ART

One tool which has been developed for carrying out the SAB technique in the field is shown in an article entitled, "Splicing of Optical Fiber Cable on Site", by H. Murata, et al. (Procedures of the Fiber Communication Conference; London; September 1975; p. 93). By means of the tool, the fiber is bent at a given radius and held in a tension-applied condition while it is scored and broken. The tool comprises a curved fiber-supporting surface, a pair of clamps which secure the fiber to the surface, means for inducing tension in the fiber, and a wedge-like diamond blade that scores the fiber. The clamps and blade are actuated by a plurality of manually adjustable rod-shaped members which are coupled to an A-shape mechanism, the legs of which are a pair of manually actuated arms and the lateral element of which is a centrally hinged linkage member. As the arms are squeezed together, the rods are pulled downward by the folding linkage, clamping the fiber to the curved surface and lowering the blade for scoring action on the fiber. The tool construction is complicated. The rod activators must be manually adjusted to achieve both the proper clamping force and blade penetration for various fiber diameters. The difficult construction of this complicated tool is reflected by its high cost.

A second fiber preparation tool for use under controlled conditions is disclosed in an article entitled, "Simplified Optical Fibre Breaking Machine" by P. Hensel, (Electronic Letters, Vol. 11, No. 24, p. 581 (27 Nov. 75)), wherein a fiber having one end secured to a fixture is secured at its other end to the periphery of a rotatable segmented drum and tensioned by the rotation of the drum. A cutting blade, working against a dashpot, scores and breaks the tensioned fiber. As stated in the article, the tool is for use under controlled conditions. The tool is larger than a hand tool and comparatively unwieldy.

SUMMARY OF THE INVENTION

It is an object, therefore, of the present invention to provide a hand-held fiber end preparation tool which is relatively simple in construction.

It is another object of the present invention to provide a fiber-end preparation tool which is similar in operation to other tools heretofore used by service personnel in, for example, electrical wire telecommunication systems.

Accordingly, a hand-held fiber-end preparation tool is disclosed comprising a pair of jaw members coupled for separating rotational movement about a pivot axis, means for biasing the jaw members in a comparatively unseparated position, first and second fiber-supporting surfaces respectively located on a different one of the jaw members for receiving and supporting an optical fiber waveguide generally circumferentially about the pivot axis, a third fiber-supporting surface interjacent the first and second surfaces and generally aligned therewith, a pair of spaced-apart handle members adapted for movement by a squeezing human hand, fiber clamping means responsive to the movement of the handle members for exerting a waveguide-securing force against the first and second fiber-supporting surfaces and for exerting a jaw-member separating force in response to further movement of the handle members, thereby inducing tensile stress along the waveguide. A descendable cutting blade, manually releasable from a suspended position above the third fiber-supporting surface is provided for response to further movement of the handle members, thereby inducing tensile stress along the waveguide. A descendable cutting blade, manually releasable from a suspended position above the third fiber-supporting surface is provided for contacting the portion of fiber waveguide thereon to produce a microcrack in the waveguide periphery, whereby the induced tensile stress in the waveguide coupled with the circumferential support thereof causes a diametric propagation of the crack across the waveguide to produce an appropriately prepared fiber end.

It may be appreciated that no scoring action is necessary with the present tool; the blade simply alights on the fiber and the microcracks produced thereby results in a complete break. Consequently, tool construction as well as tool operation is greatly simplified in that all steps are accomplished by the insertion of an optical fiber waveguide and the subsequent squeezing and releasing of the tool handles.

Other objects of the invention and further details regarding its construction will be apparent from the description of the preferred embodiment taken in conjunction with the following drawings.

BRIEF DESCRIPTION OF THE DRAWING

For the sake of clarity, like reference numerals have been used to identify the corresponding elements of each view.

DESCRIPTION OF THE PREFERRED EMBODIMENT

Figure 1:
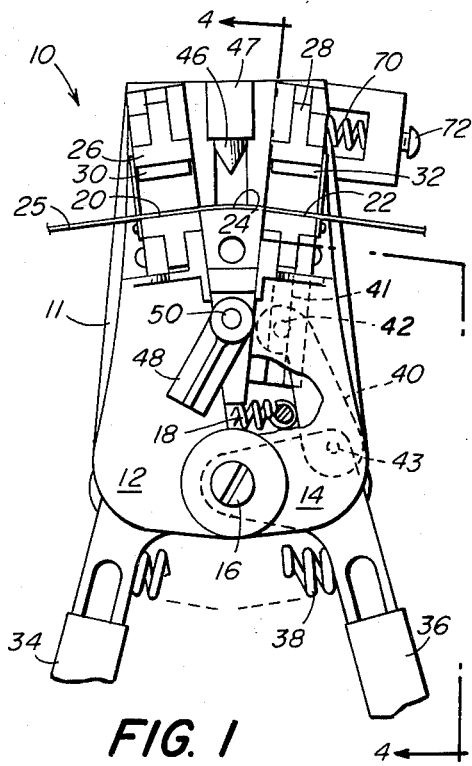
FIG. 1 shows a hand-held fiber-end preparation tool constructed in accordance with the invention.
Figure 4:
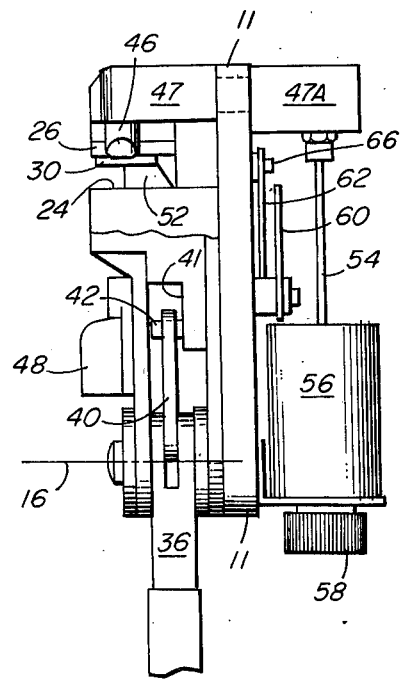
FIG. 4 is a side view of the tool of FIG. 1 partially sectioned along the line 4—4 therein.
Figure 5:
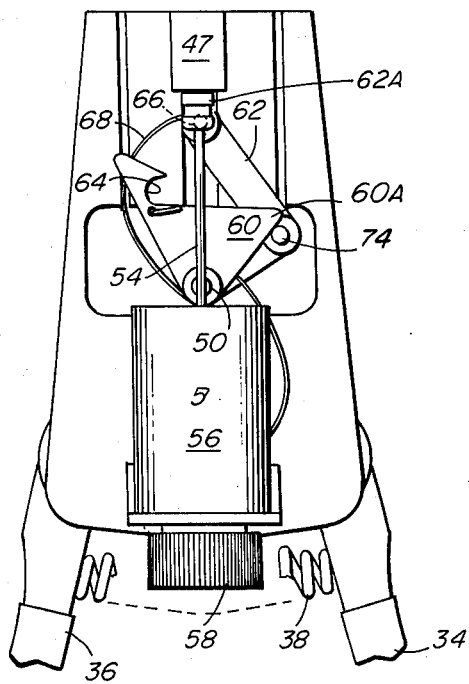
FIG. 5 is a rear view of the tool of FIG. 1 prior to the lowering of the cutting blade onto the fiber waveguide.

Referring initially to FIGS. 1, 4 and 5, the front, side, and rear views of a fiber-end preparation tool constructed in accordance with the invention is shown. Referring first to FIG. 1, the tool, shown generally at 10, is shown comprising a pair of jaw members 12, 14 coupled for separating rotation about a pivot axis which is normal to the plane of the drawing and located at 16. In the preferred embodiment, the jaw 12 is affixed to a back plate 11 while the jaw member 14 is coupled for rotation with respect thereto by such means as a bolt.

The jaw members 12, 14 are biased in a comparatively unseparated position by such means as a tensioned spring 18 coupled therebetween. The term "comparatively unseparated" is utilized to connote that the jaw members need not necessarily be contiguous in their unseparated position but may simply be spaced from each other by a lesser distance than that subsequent to the separating rotational movement of jaw 14.

Respectively associated with the jaw members 12, 14 are a pair of fiber-supporting surfaces 20, 22 which receive and support an optical fiber waveguide in a generally circumferential manner about the pivot axis 16. A third fiber-supporting surface, circumferentially disposed about the axis 16, lies interjacent the first and second surfaces 20, 22 with its ends respectively tangentially aligned therewith. The fiber-supporting surface 24 is preferably affixed to the stationary jaw member 12. The surfaces 20, 22 and 24 have machined finishes which are essentially free of nicks which would detrimentally damage the fiber. Surface 24 has a low coefficient of friction. The surface 24 may conveniently comprise a metal which is spray-coated with teflon to provide the low friction coefficient.

Figure 2:
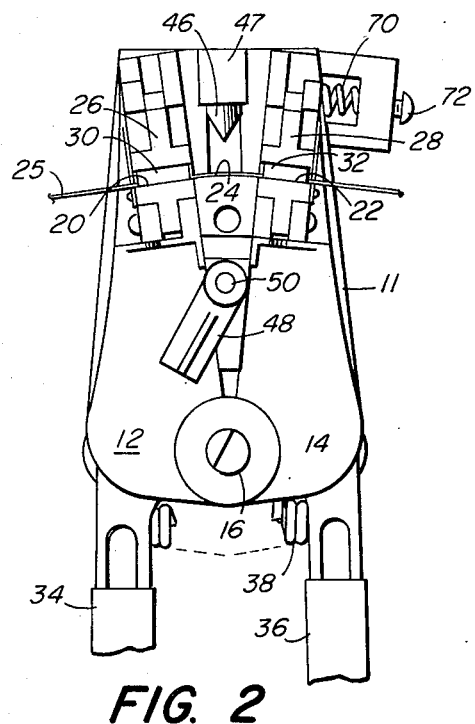
FIG. 2 shows the tool of FIG. 1 in its fiber-clamping position.

The tool 10 is held by a pair of spaced-apart handle members 34, 36 which are adapted for rotational movement about the pivot axis 16 in response to a squeezing force exerted by the operator's hand. As shown in both FIGS. 1 and 4, the handle members 34, 36 are coupled to a respective one of a pair of fiber-clamping members 26, 28 via a pair of linkage members. Handle member 36 accordingly pulls on the linking member 40 which is coupled at its other end to the fiber-clamping member 28 via a pin 42. The clamping member 28 is mounted for confined movement in a track 41 so that the squeezing of the arm 36 is translated into a movement by the fiber-clamping member 28 towards the fiber-supporting surface 22. The handle member 34 is similarly coupled to the fiber-clamping member 26 which is mounted for movement in a similar track. It may accordingly be appreciated that the compression of the handle members 34, 36 by the squeezing human hand will, as shown in FIG. 2, cause an optical fiber waveguide 25 to be securely held against the fiber-supporting surfaces. The teflon coating on the fiber supporting-surface also serves to cushion the fiber as it is bent.

Figure 3:
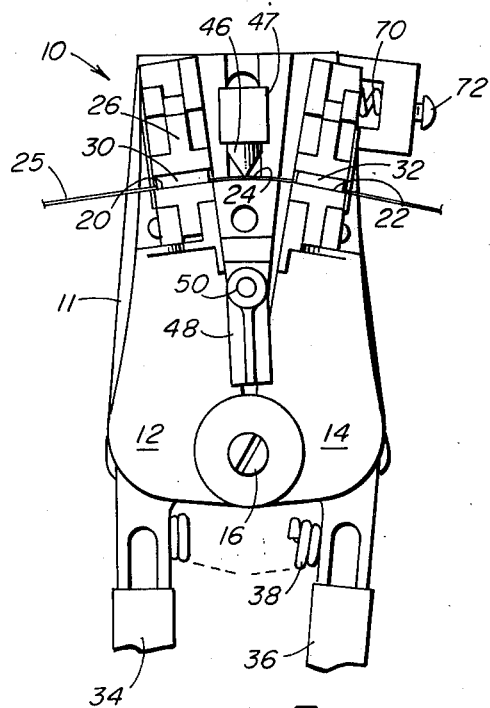
FIG. 3 shows the tool of FIG. 2 in its fiber-tensioning position with the blade alighting on the fiber waveguide.

As shown in an exaggerated manner, for clarity, in FIG. 3, further squeezing of the handle members 34, 36 causes the separating rotation of the jaw members 12, 14, inducing tensile stress in the waveguide 25. The jaw separation is caused by a clockwise torque on the jaw 14 about the axis 16 which is, in turn, produced by the lateral force of the pin 42 against the track 41. Analytically, the additional squeezing force may be conveniently resolved, with respect to the axis 16, into a generally radial component exerting the fiber-securing force, and circumferential component exerting the clockwise torque. The counter-torque produced by the tensioned spring 18, which initially maintains the jaw members in their relatively unseparated relationship, is overcome by the circumferential component when the clamp means 28 secures the waveguide 25 and additional manual squeezing force is applied to the handle 36.

The fiber-clamping members 26, 28 each include a fiber-contacting surface 30, 32 which is preferably formed from rubber. The clamping force and net tension induced on the fiber are related in a complex way by the friction coefficients of the fiber, the rubber and the fiber-supporting surfaces. Continued squeezing of the handle members 34, 36 increases the tension on the fiber between the two gripped regions. Since the fiber is not elastic, the friction coefficients are selected to allow a degree of slippage and consequently limit the induced stress level. It has been found that carbon filled butyl rubber provides a satisfactory friction coefficient.

Once the fiber waveguide 25 has been stressed, a descendable cutting blade 46 is manually released from a suspended position above the fiber supporting surface 24, shown in FIG. 2, to a fiber-contacting position shown in FIG. 3. The blade contacts the periphery of the optical fiber waveguide 25 to produce a microcrack therein. The induced tensile stress in waveguide 25, coupled with circumferential curve thereof causes a diametric propagation of the crack across the waveguide to produce an appropriately prepared fiber end. The blade 46 is preferably a diamond honed to a sharp 60° edge, and formed in a sintered metal block. Other blade materials such as saphire and tungsten carbide may also be used. As will be discussed in more detail below, the blade 46 is mounted in a slide which allows motion along an axis perpendicular to the plane that is tangent to the fiber at the point of contact of the diamond edge thereon. As will also be further discussed below, the blade 46 is preferably held in its suspended position by a thumb release latch 48 which is positioned on the tool in alignment with the natural position of an operator's thumb when the handles are being squeezed. Rotation of the thumb latch 48 from its position of FIG. 2 to its position in FIG. 3 permits the blade to fall under the influence of gravity. Preferably, however, the blade speed is slowed by means such as an air-pot to an adjusted constant velocity so that the blade just alights on the optical fiber waveguide.

Figure 6:
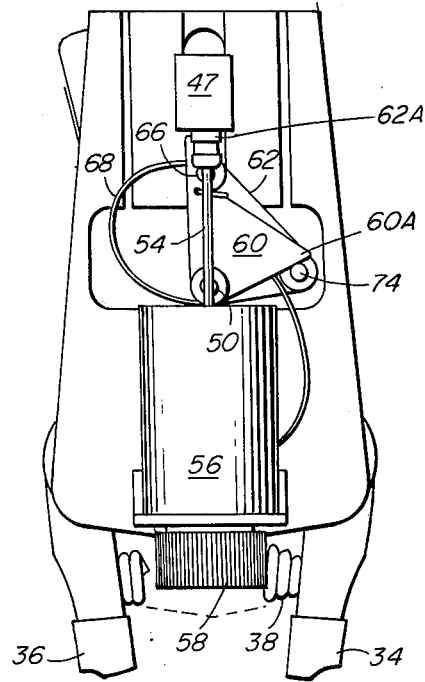
FIG. 6 is a rear view of the tool of FIG. 1 subsequent to the lowering of the cutting blade onto the fiber waveguide.

The manner in which the blade 46 is controlled may be more readily appreciated by reference to FIGS. 4 and 6. As shown in FIG. 4, which is a side view of the tool taken in partial section along the line 4—4 of FIG. 1, the blade 46 is suspended from a supporting member 47 which is, in turn, mounted for vertical sliding motion in a vertical slot formed in the backplate 11. The rear portion 47A of the supporting member 47 is coupled to an arm 54 of a dash-pot 56. The thumb latch 48 is connected by means of a pin 50, (FIG. 1) to a cam 60 shown in FIGS. 5 and 6, on the rear of the tool.

FIGS. 5 and 6 show the rear of the tool when the blade 46 and blade supporting member 47 are in the suspended, and in the fiber-contacting positions, respectively. As may be appreciated by a comparison of these two figures, the counterclockwise rotation of the thumb latch 48 in FIG. 1 causes a corresponding clockwise rotation of the cam 60 in FIGS. 5 and 6. One tip 60A of the cam 60 contacts an outwardly extending contact member 74 associated with the linkage member 62. The linkage member 62 includes an annular sleeve 62A at its other end through which the dash-pot arm 54 passes. The upper surface of the sleeve 62 supports the blade-supporting member 47 in its suspended position. It may be fully appreciated that the clockwise rotation of the cam 60 causes its edge 60A to depress the contact member 74 of the linkage member 62. The unsupported blade-supporting member 47 is thereby permitted to fall, as shown in FIG. 6, at a velocity which is limited by the dash-pot 56. The velocity may be controlled by adjusting the dash-pot via a manually rotatable thumb wheel 58 in a manner known in the art.

It should be noted that the blade may alternatively be driven from its suspended position by a spring, rather than gravity, so that the tool may be held at any angle during the fiber preparation without influencing the impact of the blade on the fiber.

In the preferred embodiment, the cam 60 is additionally provided with a hook-shaped extension 64 which engages an outwardly extending pin 66 on the sleeve 62A when the blade is in its fiber-contacting position. The engagement of the pin 66 by the cam 60 provides a locked position which may be utilized during transportation and storage of the tool in order to protect the blade.

A stop may be provided to prevent the blade from contacting and nicking the fiber-supporting surface 24.

When the thumb latch is reset to its initial position, the counterclockwise rotation of the cam 60 removes the cam surface 60A from the contact member 74. A resilient member such as leaf spring 68 is coupled to the blade supporting member 47 in a manner which exerts an upwardly directed force so that the blade returns to its initial suspended position.

Although a scoring action by the blade of the present tool has been found unnecessary for the predominant number of fiber waveguides, there may be instances where service personnel find such a capability helpful. The presently described embodiment may be easily modified to provide scoring when necessary. Accordingly, a small clearance, such as 0.005 inches, may be provided between the rear portion 47A of the blade supporting member and the backplate 11 so that a slight lateral movement thereof through the backplate slot is permitted. A resilient member such as a small, weak leaf spring may be located in the newly defined gap to prevent lateral blade movement unless the rear blade support member portions 47A is pressed forwardly.

While the foregoing description has been that of a preferred embodiment, it is understood that there are many modifications and variations to this tool which would be apparent to those skilled in the art. These changes are within the scope of the present invention which is defined in the following claims.

We claim:

1. A hand-held tool for the preparation of optical fiber waveguide ends comprising:

a pair of jaw members coupled for separating rotational movement about a pivot axis;

means for biasing the jaw members in a comparatively unseparated position;

first and second fiber-supporting surfaces respectively located on a different one of the jaw members for receiving and supporting an optical fiber waveguide generally circumferentially about the pivot axis;

a third fiber-supporting surface interjacent the first and second surfaces and generally aligned therewith;

a pair of spaced-apart handle members adapted for movement by a squeezing human hand;

fiber clamping means responsive to the movement of the handle members for exerting a waveguide-securing force against the fiber supporting surfaces and for exerting a jaw member-separating force in response to further movement of the handle members, thereby inducing a tensile stress along the waveguide; and a descendable cutting blade manually releasable from a position above the third fiber-supporting surface for contacting the portion of the fiber waveguide thereon to produce a microcrack in the waveguide periphery, whereby the induced tensile stress in the waveguide coupled with the circumferential support thereof causes a diametric propagation of the crack across the waveguide to produce an appropriately prepared fiber end.

2. The tool of claim 1 further including means coupled to the blade for limiting the rate of blade descent so that the blade alights on the waveguide cladding.

3. The tool of claim 2 wherein the limiting means comprises a dash-pot having a plunger arm coupled to the blade for movement therewith, the blade velocity being limited by viscous friction.

4. The tool of claim 1 wherein the blade is manually releasable by means of a thumb latch coupled to the blade.

* * * * *